ically arranged about the shaft and forming an annular passageway between the barrel and the shaft. A first and second flow restrictor, together with a seal means, form first and second spaced, annular chambers. The first flow restrictor separates the first annular chamber from a high pressure fluid. The seal means separates the first annular chamber from the second annular chamber. The second flow restrictor separates the second annular chamber from a low pressure fluid. The first flow restrictor retards flow from the high pressure fluid into the first annular chamber and vice versa. The seal means permits flow from the second annular chamber into the first annular chamber but prevents flow in the opposite direction. A source of pressure, preferably a compressible fluid, is connected to the second annular chamber and flows toward the first annular chamber where flow into the high pressure fluid is retarded by the first flow restrictor. The magnitude of the compressible fluid pressure determines the force which the seal exerts against the rotating shaft. The pressure ratio between the first and second annular chambers is selected to provide a low drag seal assembly wherein substantially no mixing occurs between the high pressure fluid and the compressible fluid.

United States Patent [19]

Mahan et al.

[11] 4,189,157
[45] Feb. 19, 1980

[54] END FACE SHAFT SEAL

[76] Inventors: Dudley E. Mahan, Box 138-CA, Rte. 2; James D. Mahan, Box 1074, Rte. 3; Ronnie L. Mahan, Box C-138, Rte. 2; Walter D. Sewell, Rte. 2, Box 1634, all of Odessa, Tex. 79763; Ray A. Warren, 6611 Dallas, Odessa, Tex. 79762

[21] Appl. No.: 941,609

[22] Filed: Sep. 12, 1978

[51] Int. Cl.² ............................................. F16J 15/40
[52] U.S. Cl. ........................................ 277/3; 277/27; 277/59
[58] Field of Search ................... 277/3, 15, 27, 59, 71, 277/72 R, 72 FM, 74, 79, 165, 53, 153, 152

[56] References Cited

U.S. PATENT DOCUMENTS

| 3,088,744 | 5/1963 | Ezekiel et al. | 277/3 |
| 3,575,426 | 4/1971 | Durham | 277/59 |
| 3,625,523 | 12/1971 | Gardener et al. | 277/59 |
| 3,847,453 | 11/1974 | Herbert | 277/59 X |
| 3,866,924 | 2/1975 | French | 277/59 |

FOREIGN PATENT DOCUMENTS 2756080 6/1978 Fed. Rep. of Germany ............. 277/59

Primary Examiner—Robert S. Ward, Jr.
Attorney, Agent, or Firm—Marcus L. Bates

[57] ABSTRACT

A mechanical seal for use in sealing the hole formed in a stationary bulkhead through which a marginal length of a rotating shaft is received. The seal includes a barrel attached to a flange so that the flange can be attached to the bulkhead with the barrel being concentri- 15 Claims, 6 Drawing Figures

U.S. Patent  Feb. 19, 1980  Sheet 1 of 2  4,189,157
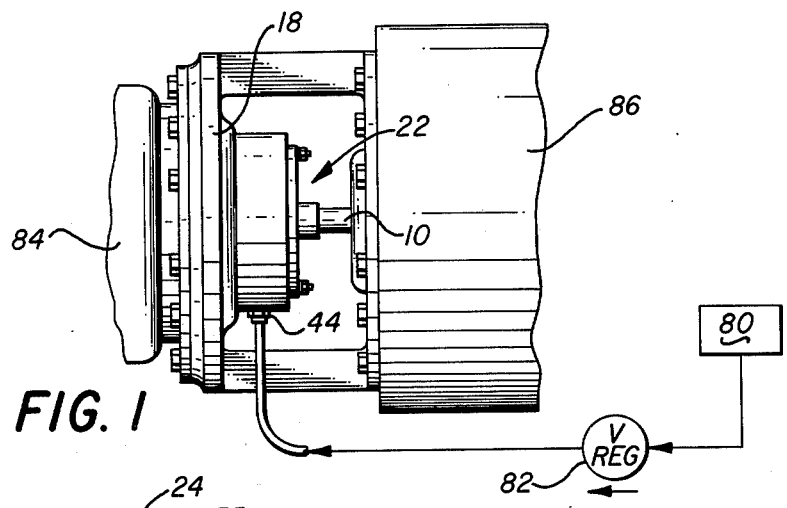
FIG. 1
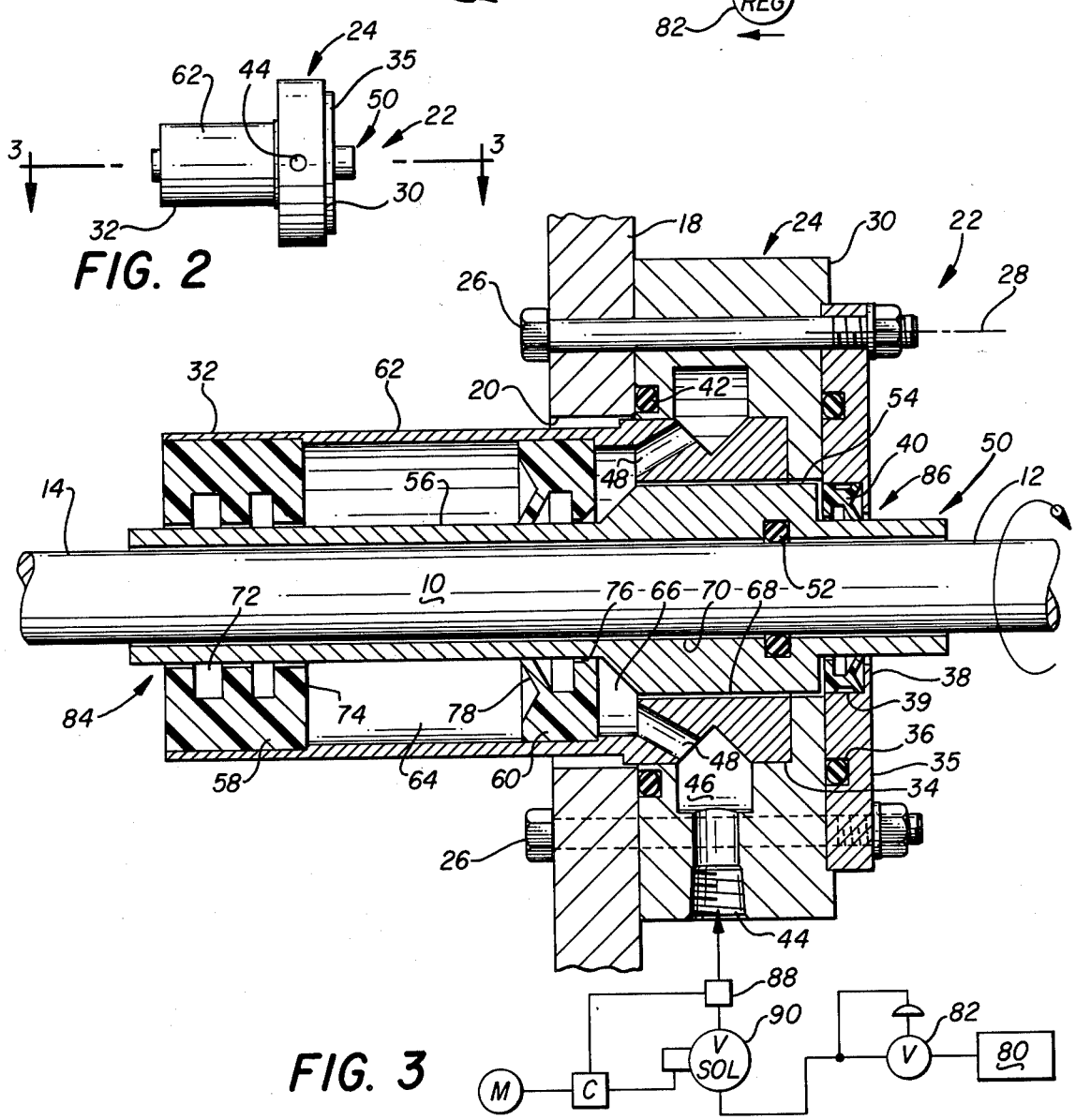
FIG. 2
FIG. 3

END FACE SHAFT SEAL

BACKGROUND OF THE INVENTION

Mechanical seals, sometimes called end face shaft seals, are usually complex in design and call for precision or close tolerance fit between the various coacting parts. The seal assembly prevents flow of fluid from a high to a low pressure fluid contained on opposed sides of a bulkhead, as for example, the bulkhead of a pump housing which receives a rotating shaft therethrough. Mechanical seals must often work in regions of high temperatures and high pressure, and in some instances must be capable of operating in abrasive and corrosive fluids. For this reason, a continuous flush through the interior of the seal has sometimes been resorted to in order to prevent ingress of contaminant into the coacting seal parts. Others have placed seals in tandem so that a second seal is available for use after the first seal has failed, and still others have undergone great expense in filtering deleterious material from the fluid upstream of the pump, thereby reducing the probability of seal failure.

It would, therefore, be desirable to have made available an inexpensive end face shaft seal apparatus which operates with little or no drag, which is provided with means by which the interior of the seal is maintained free of abrasive material, which has a minimum of moving parts, and which can withstand a high temperature environment. Such a desirable seal is the subject of the present invention.

SUMMARY OF THE INVENTION

This invention comprehends an end face shaft seal assembly for sealing the opening in a bulkhead through which a rotating shaft is received. The seal includes a main housing adapted to be mounted on the bulkhead in such a manner that an annular passageway is formed between a marginal, medial length of the shaft and the main housing.

A first flow restrictor and a seal means are mounted in spaced relationship within the passageway and along a common axial centerline respective to the shaft and to the housing. A second flow restrictor is mounted in the passageway in axially aligned relationship respective to the first flow restrictor and seal means, thereby enabling the coacting members to form spaced first and second annular chambers. The first flow restrictor separates the first annular chamber from the high pressure fluid region and admits a small fluid flow to and from the high pressure side thereof into the first annular chamber. The seal means separates the first and second annular chambers from one another and is constructed to admit fluid flow from the second annular chamber into the first annular chamber, but prevents fluid flow in the opposite direction. The second flow restrictor limits the flow of fluid from the second annular chamber towards the low pressure side of the seal assembly.

A fluid, preferably air compressed to a suitable pressure, controllably flows into the second annular chamber and to the seal means whereupon air is available for flow into the first annular chamber. The high pressure fluid acts against the seal means to deform it radially inwardly towards the shaft to preclude fluid flow towards the low pressure region. Accordingly, depending upon the ratio of the air pressure respective to the high pressure fluid, a balanced dynamic condition is achieved where the high pressure fluid is retained upstream of the seal means while the compressed air is retained downstream of the first restrictor; and hence, the apparatus of the present invention prevents flow of fluid from the high pressure region to the low pressure region. When equilibrium is established in this manner, there is very little wear between the seal and the shaft.

A primary object of the present invention is the provision of an end face shaft seal for sealing the annular space between a rotating shaft received through a bulkhead.

Another object of this invention is to provide an end face shaft seal assembly having spaced seal members located therewithin which sealingly cooperate with the outer peripheral surface of a rotating shaft in a controllable manner.

A further object of this invention is the provision of an end face shaft seal assembly having spaced seal members located therewithin which cooperate together to form spaced, annular chambers; with one of the seal members being arranged respective to one of the annular chambers whereby fluid can flow across the seal member into a common annular chamber, while fluid flow in the opposite direction is precluded.

A still further object of this invention is to disclose and provide an end face shaft seal device having spaced, annular members incorporated therein which define a common annular chamber, with one of the seal members being a seal means having an annular sealing element thereon which permits one-way flow thereacross and into the common chamber, but which prevents flow in the opposite direction, and with their being means included in the device by which the sealing action of the annular sealing element respective to the surface of the rotating shaft can be selectively adjusted.

Another and still further object of this invention is the provision of a method by which fluid flow through the annular space formed about a rotating shaft received through a bulkhead is precluded by forming an annular chamber within the annular space by the provision of spaced seal members, and by utilizing fluid flow into said annular chamber in order to vary the force with which one of the seal members engages the rotating shaft.

An additional object of this invention is the provision of a method of sealing the space between a hole in a bulkhead and a rotating shaft received therethrough by the provision of an end face shaft seal having spaced, annular chambers formed by spaced seal members therewithin, with there being means by which flow controllably occurs from either the high or low pressure side of the bulkhead into an annular chamber to thereby control the response of the seal members respective to flow through the hole.

Still another object of this invention is the provision of a shaft seal assembly having an annular mixing chamber separated from an air plenum chamber by a seal means, wherein the seal means admits air from the plenum into the mixing chamber while precluding flow in the opposite direction, and further including a flow restrictor which separates the mixing chamber from the high pressure fluid side of the seal assembly.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a fragmentary, part diagrammatical, side elevational view which discloses one operative embodiment of an end face shaft seal made in accordance with the present invention;

FIG. 2 is a side elevational view of an end face shaft seal made in accordance with the present invention;

FIG. 3 is an enlarged, cross-sectional view taken along line 3—3 of FIG. 2;

DETAILED DESCRIPTION OF THE PREFERRED EMBODIMENT

Figure 4:
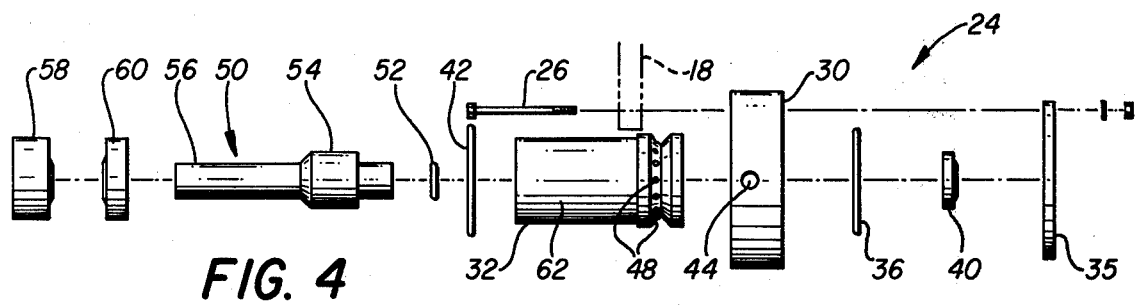
FIG. 4 is an exploded view of the apparatus disclosed in FIG. 3.

In the figures of the drawings there is disclosed a rotating shaft 10 having a low pressure powered end 12 spaced from a high pressure driven end 14. A marginal, medial length of the shaft is received through a bulkhead 18 by the provision of an aperture 20. The bulkhead can be part of a pump housing, although it could equally well be the lower fantail of a seagoing freighter, or the bulkhead could instead be the wall of a submarine which separates the interior thereof from the ocean. For the purposes of discussion, the bulkhead will be considered part of a pump housing to which there is mated an end face shaft seal 22, made in accordance with the present invention, and hereinafter often referred to as a seal assembly.

As best seen illustrated in FIG. 3, in conjunction with other figures of the drawings, the seal assembly of the present invention includes a main body 24 bolted at 26 to the pump housing 18, with a bolt circle 28 extending radially about a flange 30 in the conventional manner.

Barrel 32 forms part of the main body and is press-fit into the flange at 34, thereby mating the flange and the barrel in a permanent manner. The barrel and flange can be of unitary construction if desired.

O-ring seal 36 prevents fluid flow across the interface formed between the flange and an auxiliary body plate member 35. The plate member terminates inwardly in the form of a lip 38 which forms a circumferentially extending groove 39 within which a seal means in the form of a flow restrictor 40 is received. The flow restrictor can take on several different forms and can be a labyrinth, for example, or the illustrated, commercially available lip seal, which has been positioned to permit flow towards end 12 of the shaft.

O-ring seal 42 seals the interface formed between the pump housing and the flange. Air inlet 44 is connected to an annular air plenum chamber 46. A plurality of radially spaced-apart, inclined passageways 48 are drilled from the plenum chamber into the interior of the barrel, thereby providing flow passageway means by which a supply of compressible fluid can be delivered from a location externally of the seal assembly.

In the embodiment of FIGS. 3 and 4, a shaft sleeve 50 is secured to the shaft 10 and rotates therewith. O-ring 52 seals the interface formed between the interior of the shaft sleeve and the exterior of the shaft. The shaft sleeve is not necessary for the practice of this invention and may be omitted if desired. The sleeve includes a large o.d. marginal portion 54 spaced from opposed, reduced diameter, marginal end portions, thereby presenting reduced diameter, outer peripheral surface 56 which generally will be highly polished to provide a suitable wear surface. First and second seal means or members 58 and 60, which will be more fully described hereinafter, are positioned concentrically about the reduced diameter, marginal length of the sleeve.

The seal member 58 is in the form of a restrictor which is spaced axially from the seal means 60, with both the restrictor and the seal means being supported by press fitting into the interior of the barrel. The outer surface 62 of the barrel preferably is circular so that the barrel presents a cylindrical or annular body member which is spaced from the shaft to provide an annular passageway therebetween, within which the restrictor and seal are received.

The restrictors and the seal, in conjunction with the barrel and shaft, divide the annular passageway into an annular mixing chamber 64 and an annular air chamber 66. The annular chamber 66 is reduced in size and rearwardly continues at 68 into communication with the second flow restrictor 40. Hence, in the illustrated embodiment of FIG. 3, annular passageway 68 may be considered as part of the flow restrictor 40.

Flow restrictor 58 includes the illustrated labyrinth having grooves 72 and close tolerance member 74 which extends into close proximity of the shaft. The seal means 60 has a circumferentially extending seal lip 78 biased into low friction engagement with respect to the outer peripheral surface 56 of the sleeve member. The labyrinth 76 results from formation of the lip 78 and is not essential to the invention.

A source of compressible fluid, as for example air, is provided at 80. Regulator valve 82 interconnects the fluid source with inlet 44.

The flow restrictor 58 is positioned to be exposed to high pressure at 84, while the flow restrictor 40 is exposed to low pressure at 86, with the high pressure 84 generally being the pumped fluid, while the low pressure 86 usually is the atmosphere.

An automatic, pressure-sensitive switch 88 is connected to the motor controller to shut down the pump should the air supply at 44 fail. The controller C of motor M provides an opening current flow to solenoid valve 90, which provides air pressure on start up. Hence, in FIG. 3, when the pump motor is energized, the air is automatically supplied at inlet 44, and should the air flow to chamber 66 inadvertently be interrupted, the motor is automatically shut down, whereupon the dynamic seal lip 78 becomes a static seal to prevent leakage from the system.

As a specific example of operation of the first embodiment of the invention, assume water is being pumped to produce 60 psig at 84, atmospheric pressure is effected at 86, and 40 psig air pressure is effected at 44, with a shaft speed of 1850 rpm. At this set of variables, no fluid will flow from mixing chamber 64 across lip seal 78. A very slow leakage of air occurs across seal 40, thereby reducing wear on this unlubricated surface. Where undue wear is observed at 40, a restrictor such as seen at 58 can be substituted for the seal 40.

It was found that the pressure at 44 could be varied from 30 to 50 psig under satisfactory operating conditions. At pressures lower than 30 psig, the lip seal 78 commenced dragging against the rotating shaft, while at pressures approaching 60 psig, the danger of air flowing into the product at 84 was noted. The optimum seal pressure was found to be slightly above 30 psig.

It is believed that lip seal 78 rides on a pneumatic cushion which results from the action of the rotating shaft within annular chamber 64 and the mixture of liquid and gases contained therein, thereby greatly reducing friction. Therefore, assuming proper pressure ratios are effected as above, there is very little wear on seal means 78; because the lip thereof is separated from the rotating shaft by air or vaporized water, or a combination thereof. Hence, the lip seal probably is free floating on an underlying pneumatic cushion under ideal operating conditions. The seal of the present invention therefore exhibits a long life, because there is little wear so long as proper fluid pressure is effected at 44 to cause the lip seal to ride substantially free of the rotating shaft. The seal may be made of Teflon, or alternatively, may be of the type exemplified by National Seal No. 450336, modified to present the configuration seen in FIG. 3.

The clearance between the labyrinth and the rotating shaft or sleeve is 0.005 inches, while the annulus at 54 is 0.010 inches.

When air pressure is shut off to inlet 44, lip seal 78 is set against the sleeve, thereby precluding leakage of the pumped fluid into the plenum chamber. At shutdown, lip seal 78 therefore becomes a static seal to prevent pumped fluid from leaving the system. Hence, lip seal 78 is both a dynamic as well as a static seal.

Figure 5:
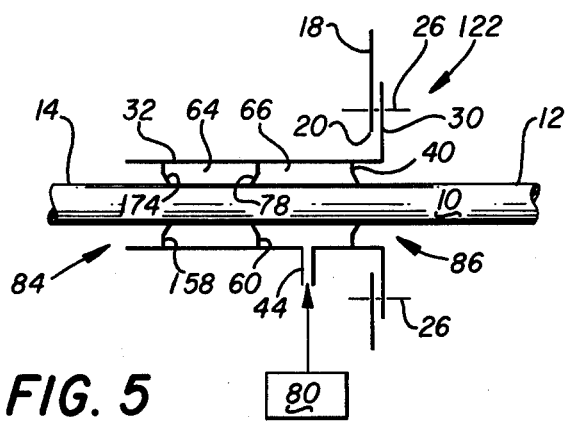
FIG. 5 is a diagrammatical representation of a second embodiment of the present invention; and, FIG. 6 sets forth a diagrammatical representation of still another embodiment of the invention.

The diagrammatical representation of FIG. 5 sets forth a second embodiment of the present invention wherein a rotating shaft 10 is received through a seal-receiving aperture 20 formed through a bulkhead 18. The seal device 122 is shown in combination with the shaft and bulkhead. The seal device includes a main body 32 having means 26 and 30 by which the main body is mounted to the bulkhead. An axial passageway is formed through the main body concentrically with the axial centerline of the shaft.

A first and second seal means, 158 and 60, are identical in construction and are mounted in spaced relationship within the axial passageway, with the first seal means 158 being exposed to a high pressure side 84 of the bulkhead, and with the first and second seal means each having a deformable lip 174 and 78 formed thereon which extend towards one another and terminate in close proximity of the shaft. The flow restrictor, second seal means, and housing form a second annular chamber 66 therebetween.

A fluid conduit can be connected to a source of fluid pressure and to inlet 44 so that fluid pressure is effected within the second annular chamber. The high pressure fluid can flow across the first seal means and into the first annular chamber where the lip 78 is deformed against the outer peripheral surface of the shaft to prevent fluid flow thereacross. Fluid pressure can flow from the source into the second chamber and across the second seal lip 78 into the first chamber, where the fluid pressure deforms the first seal lip 174 against the shaft to prevent fluid flow from the first chamber into the high pressure fluid. The flow restrictor retards flow of fluid pressure into the low pressure side 86 of the system.

Hence, it is evident that the end face seal of the second embodiment of the present invention comprehends first and second annular chambers 64 and 66 which are separated from one another and from a high pressure side 84 and low pressure side 86 by means of the spaced-apart seal means so that the force with which the first and second seal members sealingly engage the rotating shaft can be adjusted in accordance with the fluid pressure effected at chamber 66.

Figure 6:
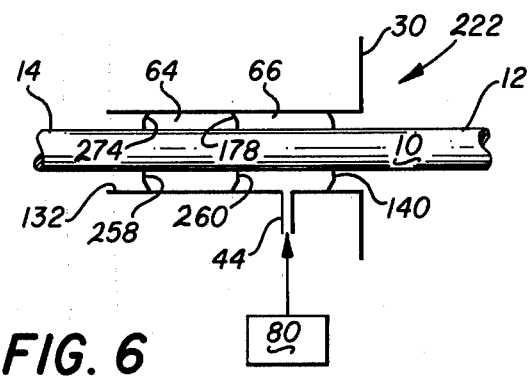

In the alternate embodiment of FIG. 6, the seals are attached to and rotate with shaft 10, with the lip seals being radially extended into contact with polished wall surface 132 of the outer housing 32. The primary or first seal means at 258 can take on the form of either of the seal means, as seen illustrated at 58 and 60 in the first embodiment of the invention.

I claim:

1. A mechanical seal device for use in sealing the opening within structure through which a shaft is received;
    said device includes a main housing adapted to be mounted to the structure, an axial passageway formed through said main housing through which a shaft can be received;
    first and second seal means mounted in spaced relationship within said passageway and along a common axial centerline; a flow restrictor mounted in said passageway in axially aligned relationship respective to said first and second seal means, with said second seal means being located between said first seal means and said flow restrictor;
    said first and second seal means cooperate with said housing to form a first annular chamber therebetween; said second seal means and said flow restrictor cooperate with one another and with said housing to form a second annular chamber therebetween; a flow passageway formed in said housing through which fluid can flow from a fluid source to said second annular chamber;
    said first seal means is of a size to permit flow to occur thereacross and into said first annular chamber under static conditions of operation, and to prevent flow thereacross under dynamic conditions of operation;
    said second seal means is of a configuration which permits flow to occur from said second into said first annular chamber while restricting flow from said first to said second annular chamber.

2. The seal device of claim 1 wherein said second seal means is made of resilient material and includes a lip formed thereon which is extensible into sealing engagement with a shaft which may be received along the axial centerline of said axial passageway; said lip extends toward said first seal means so that fluid pressure exerted within said first annular chamber seals the lip to a shaft which may be present therein.

3. The seal device of claim 2 wherein said first seal means includes a labyrinth formed thereon which retards flow into said first annular chamber.

4. The seal device of claim 1 wherein said first seal means is a labyrinth which restricts flow into and from said first chamber while said second seal means has an annular, resilient lip formed thereon which is sloped towards said first seal means to thereby preclude fluid flow from said first into said second annular chamber.

5. The seal device of claim 1 wherein said second seal means includes an annular seal member which restricts flow from said second annular chamber thereacross and prevents flow thereacross and into said second annular chamber.

6. In an apparatus of the type having a rotating shaft received through a seal-receiving aperture formed through a bulkhead with the bulkhead separating a high pressure fluid from a low pressure fluid, the combination with said shaft and bulkhead of a seal device mounted to said bulkhead and within said seal-receiving aperture;

said seal device includes a main body, means by which said main body is mounted to said bulkhead, an axial passageway formed through said main body concentrically with the axial centerline of the shaft;

a first and second seal means mounted in spaced relationship within said axial passageway, means mounting the first seal means at a location to be exposed to a high pressure side of the bulkhead; said second seal means includes a deformable seal element which extends towards said first seal means and terminates in close proximity of the outer periphery of the shaft, thereby forming a first annular chamber defined by the housing, shaft, and first and second seal means;

a flow restrictor positioned within the passageway in spaced relationship to the second seal means and extending into close proximity of the shaft; said flow restrictor, second seal means, shaft, and housing form a second annular chamber therebetween;

a fluid conduit means by which a source of fluid pressure can be connected to said second annular chamber;

whereby; said high pressure fluid can flow across said first seal means into said first chamber where the seal element of the second seal means is deformed against the shaft to retard fluid flow thereacross; and, fluid pressure can flow from said source of fluid pressure, into said second chamber, and across said seal element into said first chamber, where the high pressure fluid and the fluid from the fluid conduit means admix within said first chamber;

said flow restrictor retards the flow of fluid from said second annular chamber to the low pressure side of the bulkhead.

7. The combination of claim 6 wherein said first seal member is a flow restrictor which is concentrically arranged about the rotating shaft and restricts flow from said high pressure side of the bulkhead into said first chamber and precludes flow from said first chamber towards said high pressure side of the bulkhead.

8. The combination of claim 7 wherein said first seal means includes a seal member which is oriented towards said first chamber.

9. The combination of claim 6 wherein said first and second seal means each include a deformable, circumferentially extending lip formed thereon, each said lip is normally biased into contact with said shaft, the lip on said first seal means and the lip on said second seal means being oriented towards one another and located within said first annular chamber.

10. The combination of claim 6 wherein said source of pressure which is connected to said second annular chamber is a compressible fluid.

11. The combination of claim 10 wherein a pressure regulator is included between said source of compressible fluid and said second chamber for controlling the pressure within the last said chamber, and further including means by which said shaft is rendered nonrotating upon failure of pressure to be effected within said second chamber.

12. In a seal assembly having a main housing through which an axial passageway extends, with means being included by which the main housing can be affixed to close a hole formed in a bulkhead so that a shaft extending through the bulkhead and through the axial passageway forms an annulus between the main housing and the shaft, the improvement comprising:

first, second and third annular seal means supported within said main housing in spaced relationship to one another so that a shaft can be received through said seal means, thereby forming a first and second annular chamber between the three recited annular seal means;

means forming a flow passageway which extends through said main housing and into said second annular passageway, through which compressible fluid can flow;

said second seal means includes a deformable, circumferentially extending seal element located thereon which is adapted to be extended into proximity of a shaft, said seal element being located in facing relationship respective to the first seal means and prevents flow from said first to said second annular chamber while permitting flow from said second into said first chamber;

said third seal means being a flow restrictor which retards flow from said second annular chamber and across the third seal means;

said first seal means being a flow restrictor which retards flow thereacross and into and out of said first chamber.

13. Method of sealing the area between a rotating shaft received through a hole in a bulkhead wherein the bulkhead separates a high pressure fluid from a low pressure fluid comprising the steps of:

forming an annular passageway which extends from said high pressure to said low pressure fluid by attaching an annular body member to said bulkhead and concentrically arranging said annular member respective to the rotating shaft such that said annular passageway is formed between said rotating shaft and said annular body member;

forming spaced, first and second annular chambers within said annular passageway by supporting spaced first, second, and third seal means within said annular passageway with each said seal means being affixed to said annular body member and extending into proximity of the rotating shaft;

controlling the rate of fluid flow from the high pressure side of the bulkhead, across said first seal means, and into a first of said annular chambers;

flowing a fluid from said second annular chamber, across said second seal means, and into said first annular chamber; and, using said second seal means for preventing the flow of fluid in the opposite direction;

connecting a fluid supply to the second of said annular chambers, and adjusting the rate of flow from said fluid supply into said second annular chamber to cause the first seal means to sealingly engage the shaft with minimum drag.

14. The method of claim 13 wherein said fluid supply is a compressible fluid, and further including the step of providing said second seal means with a lip, and arranging the lip towards said first seal means so that flow from said first chamber towards said second chamber causes the lip to be deformed against the shaft.

15. The method of claim 14 and further including the steps of regulating the flow of said compressible fluid into said second annular chamber;

sensing the regulated flow of said compressible fluid to provide a signal;

preventing the shaft from rotating when the signal indicates a reduction in the rate of flow of said compressible fluid.

* * * * *